United States Patent
Moore et al.

(10) Patent No.: US 10,189,577 B2
(45) Date of Patent: Jan. 29, 2019

(54) ELECTRONIC DISPLAY OF COMPASS/MAP INFORMATION FOR ROTORCRAFT PROVIDING IMPROVED DEPICTION OF SURROUNDING OBSTACLES

(71) Applicant: Astronautics Corporation of America, Milwaukee, WI (US)

(72) Inventors: David J. Moore, Milwaukee, WI (US); Terrance J. McCraw, Grafton, WI (US)

(73) Assignee: Astronautics Corporation of America, Milwaukee, WI (US)

( * ) Notice: Subject to any disclaimer, the term of this patent is extended or adjusted under 35 U.S.C. 154(b) by 0 days.

(21) Appl. No.: 15/568,105

(22) PCT Filed: Apr. 11, 2016

(86) PCT No.: PCT/US2016/026937
§ 371 (c)(1),
(2) Date: Oct. 20, 2017

(87) PCT Pub. No.: WO2016/195816
PCT Pub. Date: Dec. 8, 2016

(65) Prior Publication Data
US 2018/0290762 A1    Oct. 11, 2018

Related U.S. Application Data

(60) Provisional application No. 62/151,098, filed on Apr. 22, 2015.

(51) Int. Cl.
*B64D 43/00* (2006.01)
*G01C 23/00* (2006.01)
(Continued)

(52) U.S. Cl.
CPC .......... *B64D 43/00* (2013.01); *G01C 23/005* (2013.01); *G06T 11/60* (2013.01); *G08G 5/0021* (2013.01); *G08G 5/0086* (2013.01); *G09G 3/003* (2013.01); *G09G 2340/12* (2013.01); *G09G 2380/12* (2013.01)

(58) Field of Classification Search
CPC ...... B64D 43/00; G01C 23/00; G01C 23/005; G01C 21/00; G06T 11/60; G08G 5/0021; G08G 5/0086; G09G 3/003
See application file for complete search history.

(56) References Cited

U.S. PATENT DOCUMENTS 6,643,580 B1 * 11/2003 Naimer ................ G01C 21/005
244/1 R
8,798,814 B1 * 8/2014 Spencer ................ B64D 43/00
244/10
(Continued)

FOREIGN PATENT DOCUMENTS

EP           1 084 380 B1      1/2010

*Primary Examiner* — Orlando Bousono
(74) *Attorney, Agent, or Firm* — Boyle Fredrickson S.C.

(57) ABSTRACT

An avionics display for rotorcraft provides a depiction of 360 degrees of terrain and obstacles about the rotorcraft using a top plan view at above a predetermined altitude that transitions to an angle perspective view as the altitude drops. The display provides improved situational awareness for highly mobile aircraft at critical times of takeoff and landing.

15 Claims, 3 Drawing Sheets

(51) Int. Cl.
*G08G 5/00* (2006.01)
*G09G 3/00* (2006.01)
*G06T 11/60* (2006.01)

(56) References Cited

U.S. PATENT DOCUMENTS

| | | | | |
|---|---|---|---|---|
| 9,384,670 | B1* | 7/2016 | Fisher | G08G 5/02 |
| 2002/0036574 | A1 | 3/2002 | Ishihara | |
| 2003/0222887 | A1* | 12/2003 | Wilkins, Jr. | G01C 23/005 |
| | | | | 345/618 |
| 2004/0160341 | A1* | 8/2004 | Feyereisen | G01C 23/00 |
| | | | | 340/970 |
| 2009/0231163 | A1* | 9/2009 | He | G01C 23/005 |
| | | | | 340/946 |
| 2010/0023187 | A1* | 1/2010 | Gannon | G01C 23/00 |
| | | | | 701/7 |
| 2010/0023189 | A1* | 1/2010 | Suddreth | G01C 23/00 |
| | | | | 701/16 |
| 2010/0066566 | A1* | 3/2010 | Reusser | G01C 23/00 |
| | | | | 340/971 |
| 2010/0073359 | A1* | 3/2010 | Suddreth | G01C 23/00 |
| | | | | 345/419 |
| 2010/0131126 | A1* | 5/2010 | He | G01C 21/00 |
| | | | | 701/14 |
| 2010/0194602 | A1* | 8/2010 | Engels | G01C 23/00 |
| | | | | 340/979 |
| 2011/0234425 | A1* | 9/2011 | Germanetti | G08G 5/045 |
| | | | | 340/945 |
| 2012/0016580 | A1* | 1/2012 | Filias | G08G 5/0086 |
| | | | | 701/301 |
| 2012/0072105 | A1 | 3/2012 | Feyereisen et al. | |
| 2013/0069801 | A1 | 3/2013 | Schafhitzel | |
| 2014/0058675 | A1* | 2/2014 | He | G01C 21/00 |
| | | | | 701/533 |
| 2014/0081484 | A1* | 3/2014 | Covington | G01C 23/00 |
| | | | | 701/16 |
| 2014/0097291 | A1* | 4/2014 | Aymeric | G01C 23/005 |
| | | | | 244/17.13 |
| 2014/0207315 | A1 | 7/2014 | He | |
| 2014/0222327 | A1* | 8/2014 | Burgin | G08G 5/0047 |
| | | | | 701/409 |
| 2015/0211883 | A1* | 7/2015 | He | G05D 1/0858 |
| | | | | 340/946 |
| 2015/0259075 | A1* | 9/2015 | Case | G01C 5/005 |
| | | | | 701/4 |
| 2016/0027310 | A1* | 1/2016 | Samuthirapandian | G08G 5/0021 |
| | | | | 345/418 |
| 2016/0103217 | A1* | 4/2016 | Samuthirapandian | G01S 7/22 |
| | | | | 701/301 |
| 2016/0152348 | A1* | 6/2016 | Mohideen | G01C 21/00 |
| | | | | 701/16 |
| 2016/0171758 | A1* | 6/2016 | Dominici | G06T 15/50 |
| | | | | 345/419 |
| 2016/0209233 | A1* | 7/2016 | Harvey | G01C 23/005 |
| 2016/0210863 | A1* | 7/2016 | Kohn-Rich | G05D 1/0646 |
| 2016/0252351 | A1* | 9/2016 | Feldmann | G01C 21/00 |
| | | | | 701/467 |

* cited by examiner

ELECTRONIC DISPLAY OF COMPASS/MAP INFORMATION FOR ROTORCRAFT PROVIDING IMPROVED DEPICTION OF SURROUNDING OBSTACLES

STATEMENT REGARDING FEDERALLY SPONSORED RESEARCH OR DEVELOPMENT

CROSS REFERENCE TO RELATED APPLICATION

This application claims the benefit of U.S. provisional application 62/151,098 filed Apr. 22, 2015, and hereby incorporated by reference.

BACKGROUND OF THE INVENTION

The present invention relates to avionics displays, for rotorcraft such as helicopters and in particular to a compass display that provides improved depiction of surrounding obstacles better corresponding with the multiple degrees of freedom of rotorcraft.

In an aircraft, such as a rotorcraft, a compass is displayed to aid in navigation. Such instruments are now entirely digital and are displayed on screens of computers. In recent years, it has become common to display a moving map beneath the compass ("map view"). The center of the compass's position on the map represents the location of the aircraft and is usually indicated by an aircraft-shaped icon.

Recently, the map view has been enhanced to provide colored contours depicting the relative height of the surrounding terrain and symbols denoting ground supported structures such as towers. These contours and symbols aid the pilot in avoiding areas where the aircraft would collide with the terrain or structures.

The color-coded contours and symbols, while representing a height dimension of the terrain and structures, still provide depiction that is essentially two-dimensional. Although relative altitude of terrain and structures is indicated, no sense of three-dimensional space is conveyed.

SUMMARY OF THE INVENTION

The present invention provides an electronic display of compass/map information that moves from a "plan" two-dimensional view to an angled three-dimensional view as the rotorcraft descends in altitude to provide an improved depiction of surrounding obstacles that better reveals their relative height and hence collision risk. In some embodiments, the area of the depicted terrain may decrease with decreased altitude to comport with the need for a more detailed understanding of local obstacles during takeoff and landing.

Importantly particularly for rotorcraft, the angled three-dimensional depiction provides information on all sides of the rotorcraft including the front and rear, reflecting the high degree of maneuverability of such aircraft.

Specifically, at least one embodiment of the invention provides an avionics display for rotorcraft having a graphic display screen and an electronic processor communicating with the graphic display screen and receiving altitude information and bearing information from the rotorcraft and terrain map data providing three-dimensional representations of terrain and location and terrain information about structures on the terrain. The electronic processor executes a stored program to: (a) at altitudes above a first predetermined altitude, provide an icon for the rotorcraft superimposed over a representation of the data of the terrain map aligned with the location of the rotorcraft from a viewpoint substantially perpendicular to a plane of the terrain; and (b) at altitudes below the first predetermined altitude, provide an icon for the rotorcraft superimposed over a representation of the data of the terrain map aligned with the location of the rotorcraft from a viewpoint at an acute angle from the plane of the terrain.

It is thus a feature of at least one embodiment of the invention to provide improved awareness to the operator of a rotorcraft of the altitude of surrounding terrain and structures during the critical times of takeoff and landing, search and rescue or other low altitude maneuvering by providing richer three-dimensional representations of the surrounding environment.

The representations of data of the terrain map may be aligned with the location of the rotorcraft to show terrain and structures on the terrain in front of and behind the rotorcraft with respect to the rotorcraft's bearing.

It is thus a feature of at least one embodiment of the invention to provide 360 degrees of terrain and structure information commensurate with the high mobility of rotorcraft.

At altitudes below the first predetermined altitude, the acute angle from the plane of the terrain may vary as a function of the altitude of the rotorcraft.

It is thus a feature of at least one embodiment of the invention to provide a smoothly varying display without jumps in perspective such as might be disorienting.

The representation of the rotorcraft may provide indications of rotorcraft dimensions below the first altitude matching a scale of the depicted terrain.

It is thus a feature of at least one embodiment of the invention to enable the rotorcraft operator to accurately assess risks of collision with terrain and structures at the time of landing or takeoff by having an accurate sense of rotorcraft dimension relative to the terrain and structures.

The representation of the rotorcraft may provide a depiction of a bubble circumscribing the rotorcraft matching a scale of the depicted terrain.

It is thus a feature of at least one embodiment of the invention to provide a simple representation of collision boundaries applicable to a wide variety of different rotorcraft.

The display may further include a compass rose aligned with the depicted terrain and surrounding the representation of the rotorcraft.

It is thus a feature of at least one embodiment of the invention to provide standard navigational information in the same display providing collision avoidance.

The compass rose may be substantially circular above the first altitude and may become an oval projection of a circle below the first altitude, the oval projection matching a projection of a circle at the angle of the viewpoint.

It is thus a feature of at least one embodiment of the invention to reinforce the sense of perspective of the display through a foreshortening of the compass rose.

The icon for the rotorcraft may provide a representation of the rotorcraft in horizontal flight from a viewpoint matching the viewpoint of the terrain.

It is thus a feature of at least one embodiment of the invention to further reinforce the perspective of the display through a properly rendered perspective representation of the rotorcraft.

The structures on the terrain may be depicted as abstract three-dimensional shapes above the first altitude and maybe depicted as representational shapes below the first altitude.

It is thus a feature of at least one embodiment of the invention to emulate the increased detail of visually proximate structures to reinforce rotorcraft altitude information particularly at a risk threshold that is crossed below certain altitudes were terrain collision is more likely.

Above the first altitude, the height of the terrain and structures may be represented by color.

It is thus a feature of at least one embodiment of the invention to provide elevation information that be consistently applied at the range of altitudes and different viewpoints provided by the display to prevent abrupt display changes.

The orientation of the representation of the rotorcraft on the display may be fixed with respect to the display and the terrain may rotate with rotation of the aircraft.

It is, thus a feature of at least one embodiment of the invention to provide a traditional orientation of the representation of aircraft on an own-aircraft display.

The display of structures may represent the structures as occupying a predetermined minimum area above the first altitude larger than the actual area of the structures on the depicted terrain and the display of structures below the first altitude increasingly may match the actual area of the structures on the depicted terrain as altitude decreases.

It is thus a feature of at least one embodiment of the invention to ensure good visibility of elevated structures even at high altitudes while providing improved altitude cues and assessment of collision risk at low altitudes by scaling the structures appropriately.

These particular objects and advantages may apply to only some embodiments falling within the claims and thus do not define the scope of the invention.

DETAILED DESCRIPTION OF THE PREFERRED EMBODIMENT

Figure 1:
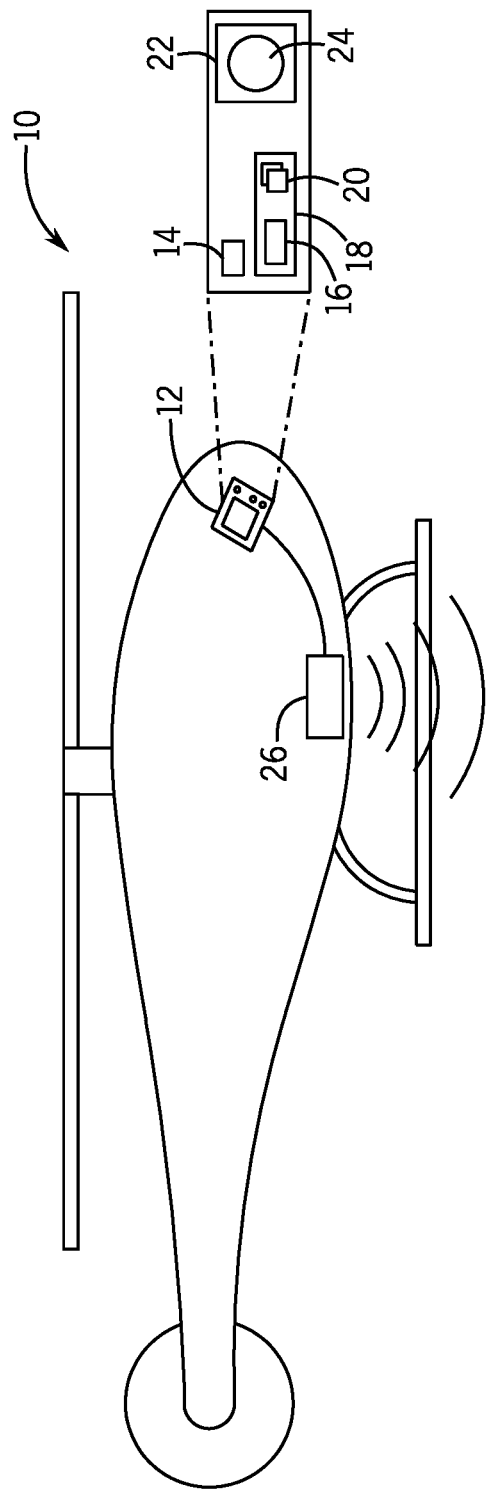
FIG. 1 is a phantom view of a helicopter showing an electronic display of compass/map information per the present invention communicating with helicopter avionics determining altitude, heading, and compass bearing.

Referring now to FIG. 1, a rotorcraft 10 such as a helicopter may provide for an electronic display instrument 12 in a helicopter cockpit to provide navigational guidance to a pilot. The electronic display instrument 12 may include an electronic processor 14 communicating with a memory 16 holding an operating program 18 and, terrain maps 20 providing terrain features and their elevations through a set of bounding points in three dimensions. The electronic processor 14 may also communicate with a graphic display screen 22 such as a liquid crystal display screen or plasma display serum to provide an electronic display of compass/amp information 24 as will be discussed below. The electronic display instrument 12 may communicate with other avionics 26, for example, including navigational systems for determining heading, radar for determining altitude, and the like.

The inventive features of the present electronic display instrument 12 may be incorporated into or combined with an existing "Electronic Navigation Display, or a "Primary Flight Display" (PFD) or a "Navigation Display" (ND) but is not limited to incorporation in or combination with those devices.

Figure 2:
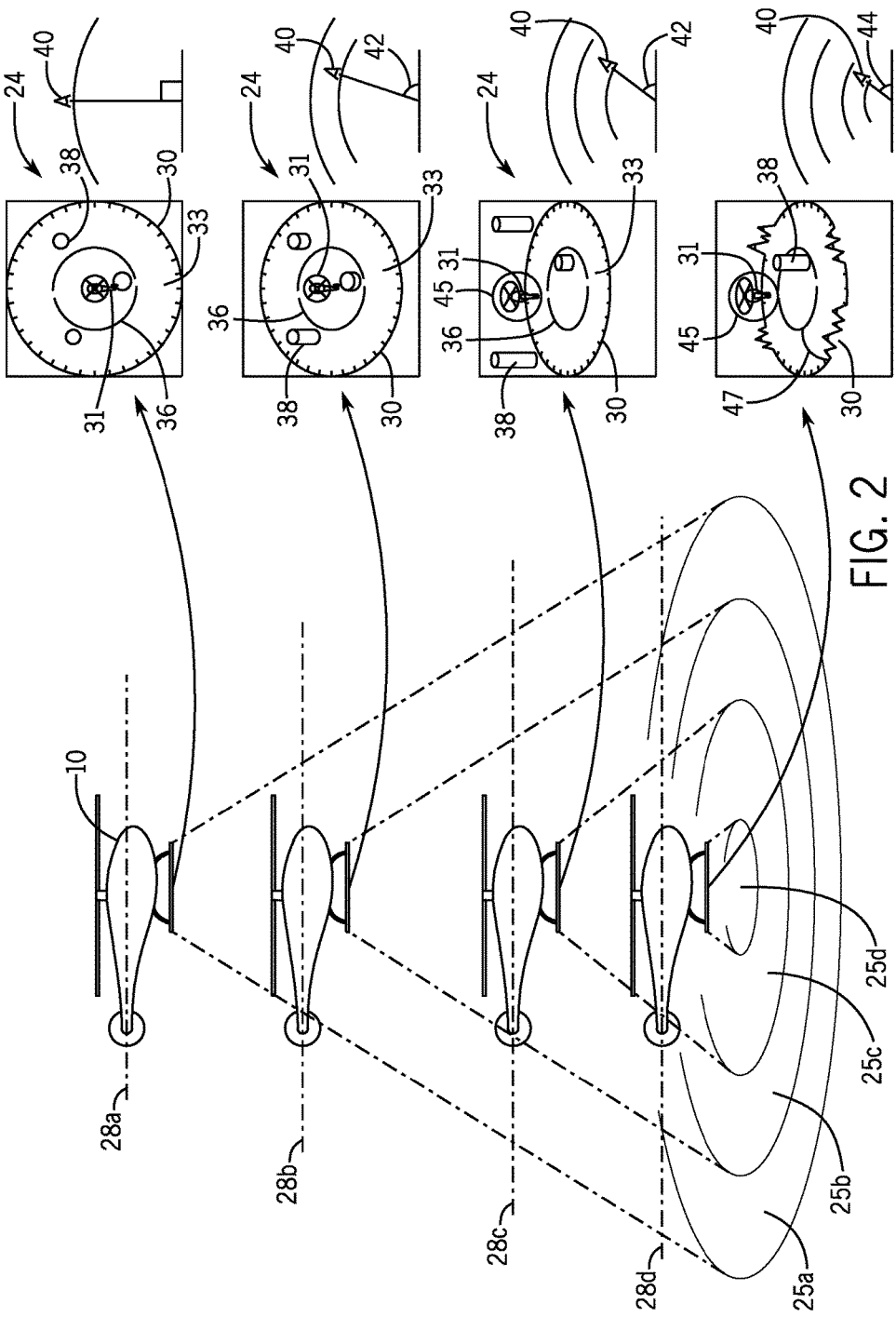
FIG. 2 is a side elevational view of a helicopter during landing showing the transformation of the electronic display of compass/map information at different altitudes.
Figure 3:
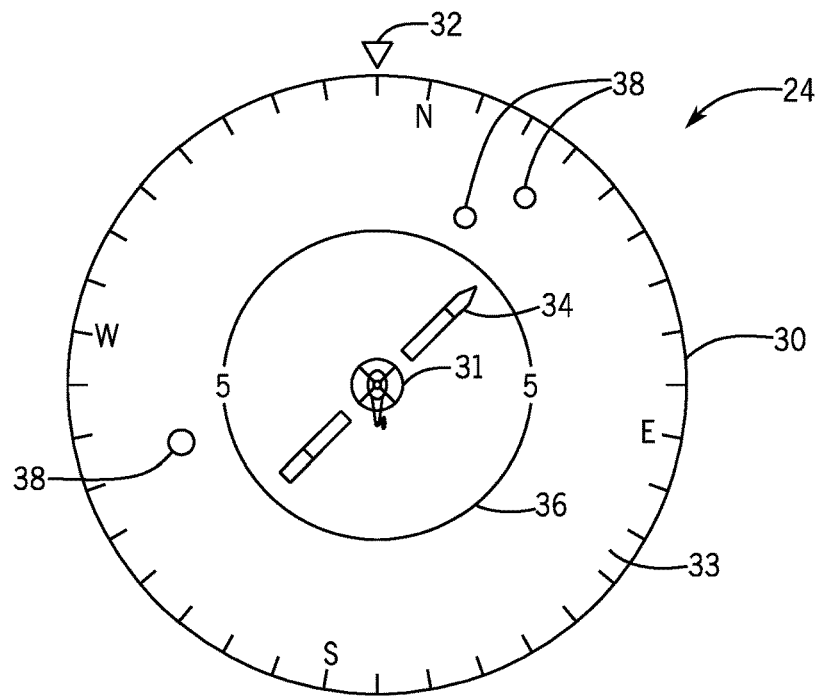
FIG. 3 is a detailed view of the electronic display of compass/map information at a high altitude providing a conventional two-dimensional depiction of obstacles.

Referring now to FIGS. 2 and 3, when the rotorcraft 10 is at a first altitude 28a, for example, above 300 feet, the electronic display of compass/map information 24 may present a circular compass rose 30 indicating the compass points of North, South, East, and West as well as angular compass values. The compass rose 30 rotates with respect to a heading indicator 32 on the display, the latter representing a direction of the nose of the rotorcraft 10 and providing an indication of the compass direction in which the rotorcraft is pointed. Information for the rotation of the compass rose 30 is provided by a digital compass or a gyroscope in the avionics 26.

Centered within the compass rose 30 is an aircraft symbol 31 showing a top plan view of the rotorcraft 10 as properly aligned with the heading indicator 32 in normal horizontal flight. It will be appreciated that the location of the aircraft symbol 31 in the center of the electronic display of compass/map information 24 allows the electronic display of compass/map information 24 to provide information about the environment of the rotorcraft 10 in both the front and the back of the rotorcraft 10.

Positioned visually beneath the compass rose 30 and aircraft symbol 31 is an aviation map 33 depicting the ground and terrain features beneath the rotorcraft 10, for example, as a relief map having shading such as would be produced by oblique illumination of that terrain. Generally the information for depiction of ground and terrain features comes from a combination of onboard radar, for example, in the avionics 26 and the terrain maps 20 linked to the location of the rotorcraft 10, for example, by a GPS signal. Height of the terrain may be represented two-dimensionally by means of colors.

A course pointer 34 may also be provided on the electronic display of compass/map, information 24 indicating a desired direction of the rotorcraft 10 as well as a half range circle 36 labeled with the radius (in this example, five nautical miles) indicating that the area 25a of the terrain of the map 33 encompassed by the compass rose 30, in this example, has a diameter of 10 nautical miles. Again altitude information from the avionics 26 may be used to adjust these scale indications and the size of the terrain map 20 projected within the compass rose 30.

Positioned at various locations on the map 33, as derived from underlying data of the terrain map 20, are obstacle symbols 38, for example, abstracted as circles but possibly being other two-dimensional shapes. These symbols may change color, for example, from white to red if the altitude of the obstacles underlying the obstacle symbols 38 is greater than or equal to the altitude of the rotorcraft 10. The obstacle symbols 38 may be associated with towers, buildings or the like.

At this altitude 28a, the electronic display of compass/map information 24 depicts the terrain of the map 33 as if viewed by an observer 40 directing his or her gaze perpendicularly downward toward the surface of the earth with the compass rose 30 extending in a horizontal plane.

Figure 4:
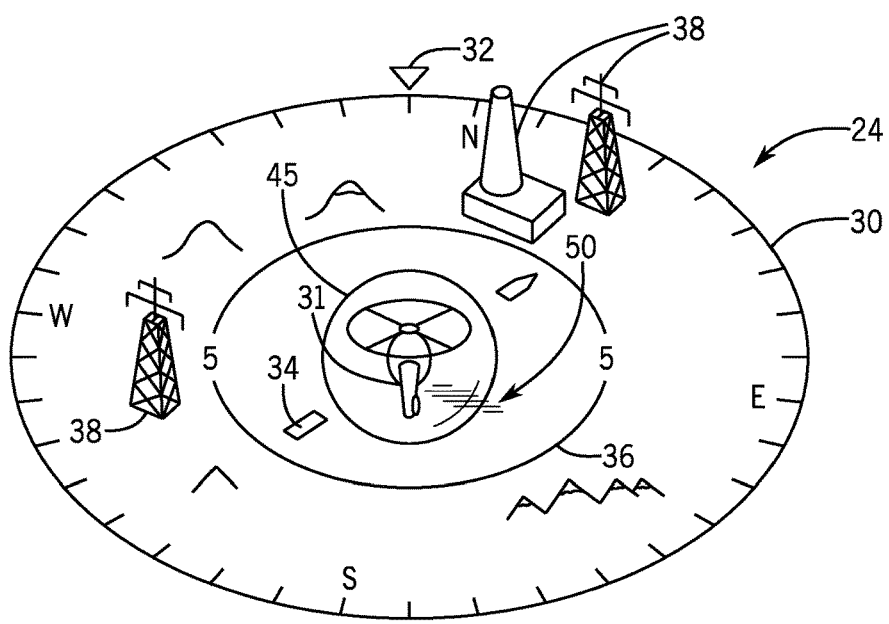
FIG. 4 is a view similar to FIG. 3 of the electronic display of compass/map information at a lower altitude providing a three-dimensional depiction of obstacles.

As also shown in FIG. 4, as the rotorcraft 10 descends in, altitude to altitude 281, for example, less than 300 feet and more than 100 feet, representing a height at which there is danger of collision with structures or terrain on the earth, the electronic display of compass/map information 24 gradually transforms from a display of the perpendicular viewpoint discussed above of the flat compass rose 30 on top of a map 33, to an angled display with the observer 40 at an acute angle 42 with respect to the horizontal surface of the earth. In addition, the depiction of the terrain is enlarged as if from a closer observer 40 manifested by a decreasing area 25*b* of the map within the compass rose 30. With this rotation of the electronic display of compass/map information 24, the electronic display of compass/map information 24 begins to reveal the third dimension of height manifest in three-dimensional terrain features and obstacle symbols 38 that show a height dimension, for example, cylinders extending above the circles of the obstacle symbols 38. The relative height of the obstacle symbols 38 may vary according to the actual elevation of these obstacles derived from map data of the terrain maps 20, and those obstacle symbols 38 that represent collision risks, that is, those having a height greater than or equal to the altitude of the rotorcraft 10, may be colored red in contrast to white used in other obstacle symbols 38. Generally all of these obstacle symbols 38 may be larger than the obstacles they represent so as to make those obstacle symbols 38 visible regardless of their actual scale.

Alternatively, obstacle symbols 38 which previously were denoted as two-dimensional symbols may smoothly transition into the appearance of actual objects as viewed at an angle 42. In addition aircraft symbol 31 may transform into a three-dimensional model of the aircraft in its position relative to the terrain. Obstacles and terrain both in front of and behind the rotorcraft 10 with respect to its heading indicator 32 will be depicted.

As the rotorcraft 10 continues to descend to an altitude 28*c*, for example, under 100 feet, the angle 42 may transform into shallower angle 44, for example, concluding at an angle of about 45 degrees. At this angle, the height dimension of the obstacle symbols 38 is more apparent, as is the variation in terrain height depicted in the map 33. The area of the map 33 within the compass rose 30 further decreases to area 25*c*, for example, consistent with a 50 degree cone of vision and a closer location of the observer 40 to the ground. At this point an aircraft periphery bubble 45 may be generated on the electronic display of compass/map information 24, being a depiction of a spherical semitransparent shell centered about the rotorcraft 10. The periphery bubble 45 visible about the aircraft symbol 31 shows the relative scale of the rotorcraft 10 with respect to the surrounding features and depicts an Outer surface that reflects a point at which a collision with the aircraft would occur from the surrounding obstacle symbols 38. In addition the size of the half range circle 36 with respect to the displayed area increases and fractional range lines 47 may appear within a half-range circle 36 to provide a visual sense of the decrease in altitude and decrease in, area of the map 33. As before, the display shows terrain and obstacles both in front of and in back of the rotorcraft 10.

As the aircraft continues to descend, for example, to altitude 28*d* immediately before landing, the angle 44 of the observer 40 remains constant but the area of the map 33 depicted within the compass rose 30 may decrease to area 25*d*, this reduction providing improved local awareness of obstacles. The periphery bubble 45 increases comparably and some of the obstacle symbols 38 may be removed as outside of the depicted area to reduce clutter. A shadow 50 may be placed below the aircraft symbol 31 to help gauge height from the ground. The display continues to show terrain and obstacles both in front of and in back of the rotorcraft 10.

Once the transition is complete, the previously "flat" appearing map 33 now appears as an angled aerial view of the surrounding terrain. The positions of obstacles in the area near the rotorcraft 10 are enhanced by depicting their heights due to the three-dimensional nature of the view, enabling a pilot to more precisely recognize the position and criticality of collision dangers near the aircraft. Rotation of the viewpoint of the map and expansion of elevational features may be accomplished with standard image rotation techniques augmented, for example, using a graphic processor unit working on underlying three-dimensional data.

When the rotorcraft 10 ascends above a minimum height or relocates to a position where collision is no longer a threat, the view gradually transitions back to a normal compass and map view in the reverse order as was described above.

In one embodiment, the depiction of the dimensionality of the obstacle symbols 38 may be suppressed when the altitude of the aircraft means there is no collision risk to reduce distraction and clutter.

The term "substantially circular" as used with respect to the compass rose 30 is intended to cover shapes that are rotationally symmetric including, many sided polygons and the like such as can readily be substituted for circle in the application of a compass rose. Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and, words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements, or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

It is specifically intended that the present invention not be limited to the embodiments and illustrations contained herein and the claims should be understood to include modified forms of those embodiments, including portions of the embodiments and combinations of elements of different embodiments as come within the scope of the following claims. All of the publications described herein, including patents and non-patent publications, are hereby incorporated herein by reference in their entireties.

What we claim is:

1. An avionics display for rotorcraft comprising:
   a graphic display screen;

an electronic processor communicating with the graphic display screen and receiving altitude information and bearing information from the rotorcraft and terrain map data providing three-dimensional representations of terrain, and location and height if about structures on the terrain, the electronic processor executing a stored program to:
(a) at altitudes above a first predetermined altitude, provide an icon for the rotorcraft superimposed over a representation of the data of the terrain map aligned with the location of the rotorcraft from a viewpoint substantially perpendicular to a plane of the terrain; and
(b) at altitudes below the first predetermined altitude, provide an icon for the rotorcraft superimposed over a representation of the data of the terrain map aligned with the location of the rotorcraft from a viewpoint at an acute angle from the plane of the terrain.

2. The avionics display for rotorcraft of claim 1 wherein the representations of data of the terrain map aligned with the location of the rotorcraft show terrain and structures on the terrain in, front of and behind the rotorcraft with respect to the rotorcraft's bearing.

3. The avionics display for rotorcraft of claim 1 wherein the representation of the data of the terrain map is enlarged on the display, depicting a smaller area of terrain in greater detail, as a function of decreasing altitude.

4. The avionics display for rotorcraft of claim 1 wherein at altitudes below the first predetermined altitude, the acute angle from the plane of the terrain varies as a function of the altitude of the rotorcraft.

5. The avionics display for rotorcraft of claim 1 wherein the representation of the rotorcraft provides indications of rotorcraft dimensions below the first altitude matching a scale of the depicted terrain.

6. The avionics display for rotorcraft of claim 5 wherein the representation of the rotorcraft provides a depiction of a bubble circumscribing the rotorcraft matching a scale of the depicted terrain.

7. The avionics display for rotorcraft of claim 1 further including a compass rose aligned with the depicted terrain and surrounding the representation of the rotorcraft.

8. The avionics display for rotorcraft of claim 7 wherein the compass rose is substantially circular above the first altitude and becomes an oval projection of a circle below the first altitude, the projection matching a projection of a circle at the angle of the viewpoint.

9. The avionics display for rotorcraft of claim 1 wherein the icon for the rotorcraft provides a representation of the rotorcraft in horizontal flight from a viewpoint matching the viewpoint of the terrain.

10. The avionics display for rotorcraft of claim wherein the first altitude is greater than 100 feet.

11. The avionics display for rotorcraft of claim 1 wherein structures on the terrain are depicted as abstract three-dimensional shapes above the first altitude and are depicted as representational shapes below the first altitude.

12. The avionics display for rotorcraft of claim 1 wherein above the first altitude, the height of the terrain and structures are represented by color.

13. The avionics display for rotorcraft of claim 1 wherein an orientation of the representation of the rotorcraft on the display is fixed with respect to the display and the terrain rotates with rotation of the rotorcraft.

14. The avionics display for rotorcraft of claim 1 wherein a display of structures represents the structures as occupying a predetermined minimum area above the first altitude larger than an actual area of the structures on the depicted terrain and the display of structures below the first altitude increasingly matches the actual area of the structures on the depicted terrain as altitude decreases.

15. A method of depicting a location of a rotorcraft using an avionics display having:
a graphic display screen;
an electronic processor communicating with the graphic display screen and receiving altitude information and bearing information from the rotorcraft and terrain map data providing three-dimensional representations of terrain and location and height information about, structures on the terrain, the electronic processor executing a stored program to: at altitudes above a first predetermined altitude, provide an icon for the rotorcraft superimposed over a representation of the data of the terrain map aligned with the location of the rotorcraft from a viewpoint substantially perpendicular to a plane of the terrain; and at altitudes below the first predetermined altitude, provide an icon for the rotorcraft superimposed over a representation of the data of the terrain map aligned with the location of the rotorcraft from a viewpoint at an acute angle from the plane of the terrain; the method comprising the steps of;
(a) determining an altitude of the rotorcraft;
(h) determining a location of the rotorcraft;
(c) displaying a depiction of the rotorcraft superimposed over a representation of terrain of the location; wherein a viewpoint of the terrain of the location has an angle that is a function of the altitude of the rotorcraft.

* * * * *